United States Patent [19]

Moler

[11] Patent Number: 5,144,373
[45] Date of Patent: Sep. 1, 1992

[54] DETECTION OF RANGE DISCONTINUITIES IN STEREOSCOPIC IMAGERY

[75] Inventor: Keith E. Moler, Santa Ana, Calif.

[73] Assignee: Loral Aerospace Corp., New York, N.Y.

[21] Appl. No.: 388,542

[22] Filed: Aug. 2, 1989

[51] Int. Cl.$^5$ .............................................. G01C 11/22
[52] U.S. Cl. ....................................... 356/2; 356/376; 382/9
[58] Field of Search ....................... 356/2, 3, 8, 11, 12, 356/22, 14, 4, 376; 364/456, 453, 462, 561, 522, 449; 382/41, 60, 9, 1, 19, 22; 250/558

[56] References Cited

U.S. PATENT DOCUMENTS

| | | | |
|---|---|---|---|
| 2,988,953 | 6/1961 | Barnett | 250/558 |
| 3,961,851 | 6/1976 | Gerharz | 356/1 |
| 4,489,389 | 12/1984 | Beckwith et al. | 364/522 |
| 4,539,701 | 9/1985 | Galbreath et al. | 356/2 |
| 4,601,053 | 7/1986 | Grumet | 382/1 |
| 4,635,203 | 1/1987 | Merchant | 364/458 |
| 4,842,411 | 6/1989 | Wood | 356/2 |

OTHER PUBLICATIONS

"Dynamic Occlusion Analysis in Optical Flow Fields" by W. B. Thompson & K. M. Mutch, *IEEE Transactions on Pattern Analysis and Machine Intelligence*, vol. 7, pp. 374–383 (1985).

"Exact Area Registration of Different Views of a Common Object Scene", *Optical Engineering*, May/Jun. 1981, vol. 20, No. 3, pp. 424–436.

*Primary Examiner*—Richard A. Rosenberger
*Assistant Examiner*—Hoa Pham
*Attorney, Agent, or Firm*—Harry G. Weissenberger; Edward J. Radlo; Keith L. Zerschling

[57] ABSTRACT

Range discontinuities (44) in an imaged scene are located with superior accuracy by using a pair of stereoscopically related images (10, 12) of the scene to sense edges in the scene, and to determine the range of correlatable image pixels; segmenting the scene into regions (36) of similar intensity; assigning to each region (36) a range based upon the range of any correlatable pixels in it; and locating the boundary (44) between adjacent regions of substantially dissimilar range.

6 Claims, 8 Drawing Sheets

DETECTION OF RANGE DISCONTINUITIES IN STEREOSCOPIC IMAGERY

FIELD OF THE INVENTION

This invention relates to a process for reconstructing three-dimensional image information from a sequence of two-dimensional images, and more particularly to a method for accurately locating range discontinuities in the imaged scene.

BACKGROUND OF THE INVENTION

Computerized object recognition is useful in many fields. For example, in a forward terrain display based on infrared imaging for night flying, it is important to display accurate outlines of obstacles such as hills against a cluttered background; or in the automatic recognition of an unknown object by comparing its shape to known reference object shapes, it is important that the outline of the unknown object be accurately determined.

In prior art techniques such as that described in the article entitled "Dynamic Occlusion Analysis in Optical Flow Fields" by W. B. Thompson and K. M. Mutch, *IEEE Transactions on Pattern Analysis and Machine Intelligence*, vol. 7, pp. 374-383 (1985), range discontinuities in a scene are determined by locating image areas in which the range of image components changes abruptly. A problem with this approach is that in order to determine the range of an image component, the component must be identifiable (as, e.g., by the presence of an intensity transition or edge) in each of two images of the scene taken from slightly different locations (referred herein as pairs of stereoscopically related images), so that its range can be computed from its relative displacement between, and location, in the two images. As a result, range information in cluttered, noisy or indistinct images is available for only a relatively small number of pixels in a given scene. The range of the remaining pixels must be determined by interpolation—a problem which is further complicated by any noise spikes appearing in the image.

Because of this interpolation, which inherently reduces the sharpness of transitions, locating range discontinuities is difficult and potentially inaccurate. It is therefore desirable to provide a method of locating range discontinuities which is more accurate and reliable.

Besides the article mentioned above, the prior art includes the following references:

Gerharz U.S. Pat. No. 3,961,851 which relates to the synchronized control of multiple cameras for the purpose of passive ranging by a human operator; Beckwith et al. U.S. Pat. No. 4,489,389 which relates to a perspective map display but does not involve any ranging; Grumet U.S. Pat. No. 4,601,053 which measures range by using side-by-side TV cameras but does not deal with range discontinuity detection; Merchant U.S. Pat. No. 4,635,203 which computes range information for each point in a scene but tends to smooth out discontinuities rather than sharpen them because it fails to prohibit interpolation across segmentation boundaries; and Merchant "Exact Area Registration of Different Views of a Common Object Scene", *Optical Engineering*, May/June 1981, Vol. 20, No. 3, pp. 424-436, which deals with a transformation algorithm for providing exact area registration in a scene but is not concerned with range discontinuity detection.

DISCLOSURE OF THE INVENTION

The invention allows highly accurate plotting of range discontinuities (44) in stereoscopic images (10,12) by assuming that significant range discontinuities (44) in an image (10) are present wherever a change in range coincides with a change in intensity, i.e. that significant range discontinuities can only occur along boundaries between image components of different intensities, i.e. along edges.

With this assumption in mind, the inventive method examines the images (10,12) by conventional edge detection routines such as the Marr-Hildreth algorithm. The detected edges, which inherently must define closed figures, are plotted to form a map of image regions (36). A range-related parameter (hereafter referred to as the range value or range information) is simultaneously determined for those points (31) in the image (10) for which range can be calculated by means of a Barnard-Thompson algorithm.

For each individual image region (36), the parameters of the computed points (31) lying within that region are interpolated and the pixels of the region (36) are filled with the gray-scale value corresponding to the interpolated range value. If no ranged point (31) lies within the region (36), the pixels of the region (36) are filled with a null value.

The plotting of the image regions (36) with their respective gray scale values produces an image (42) in which every pixel has a gray scale range value (or a null value in the case of regions which lack any range information) assigned to it and the boundaries between regions are clearly defined.

The last-mentioned image is now once again examined by an edge-detection routine whose parameters are set to plot only those region boundaries (44) where the difference between the range values on each side of the boundary exceeds a predetermined minimum. Substantial computing power is saved in this step by evaluating the range information only at region boundaries, not in each pixel of the image.

BRIEF DESCRIPTION OF THE DRAWINGS

FIG. 4 is a map of intensity segmentation regions for the image of FIG. 2a;

FIG. 5 is a gray-scale range representation of the image of FIG. 2a;

DESCRIPTION OF THE PREFERRED EMBODIMENT

Figure 1:
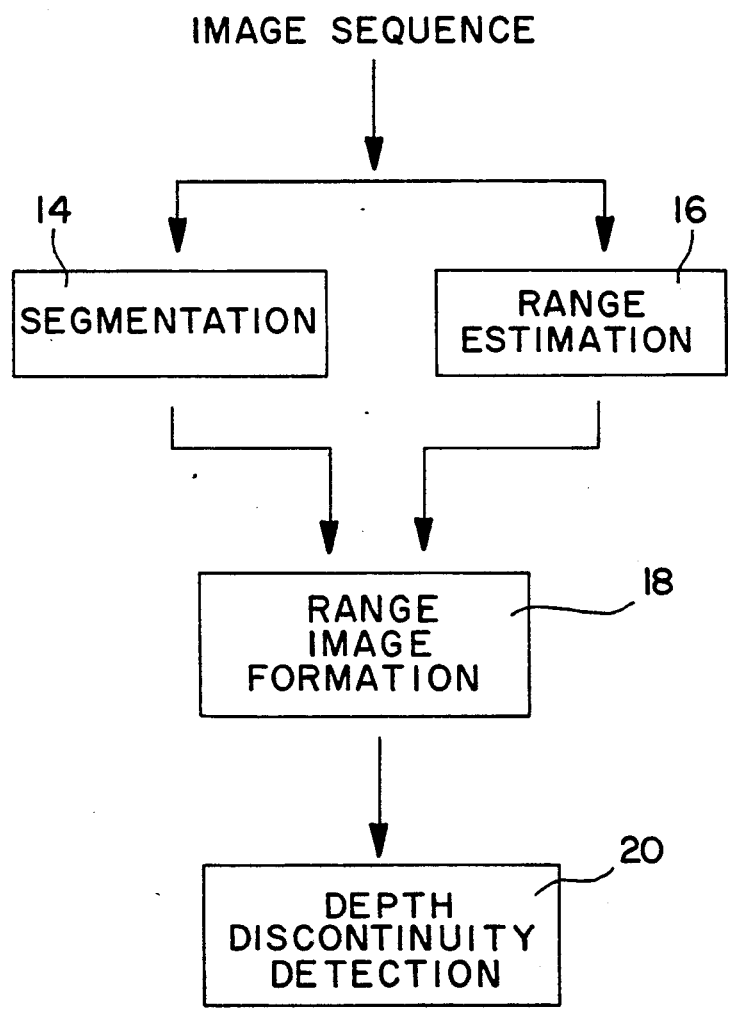
FIG. 1 is a block diagram illustrating the method of this invention.
Figure 2A:
FIGS. 2a and 2b are a pair of infrared images of a landscape scene taken from slightly different angles.
Figure 2B:

The input information for the inventive method is an image sequence consisting, for example, of a pair of spatially displaced images 10,12 (FIGS. 2a and 2b, respectively). The images 10,12 may be taken simultaneously by a pair of spaced cameras or sequentially by a moving camera.

Figure 4:
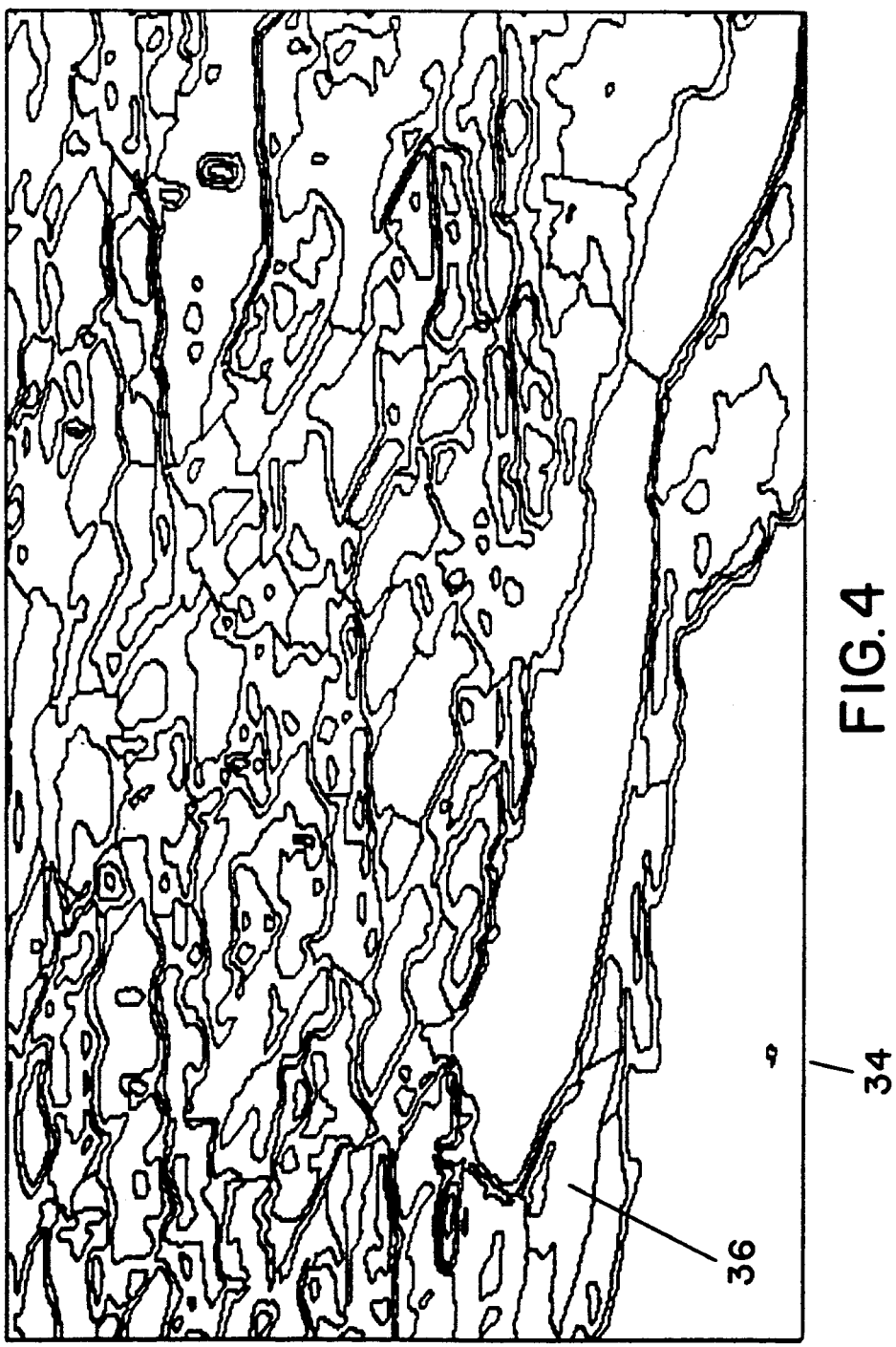

A segmentation routine 14 and an optical flow field generation or range estimation routine 16 are performed on the input image sequence. The segmentation routine is performed on one of the images 10,12 to locate and map substantially abrupt intensity transitions in the image. The mapping of these transition segments the image 10 or 12 into a number of closed regions (FIG. 4). A conventional computer program routine such as a segmentation algarithm or a Marr-Hildreth algorithm examines the image 10 pixel by pixel, and stores in an appropriate memory the pixel locations where intensity transitions occur.

Figure 6:
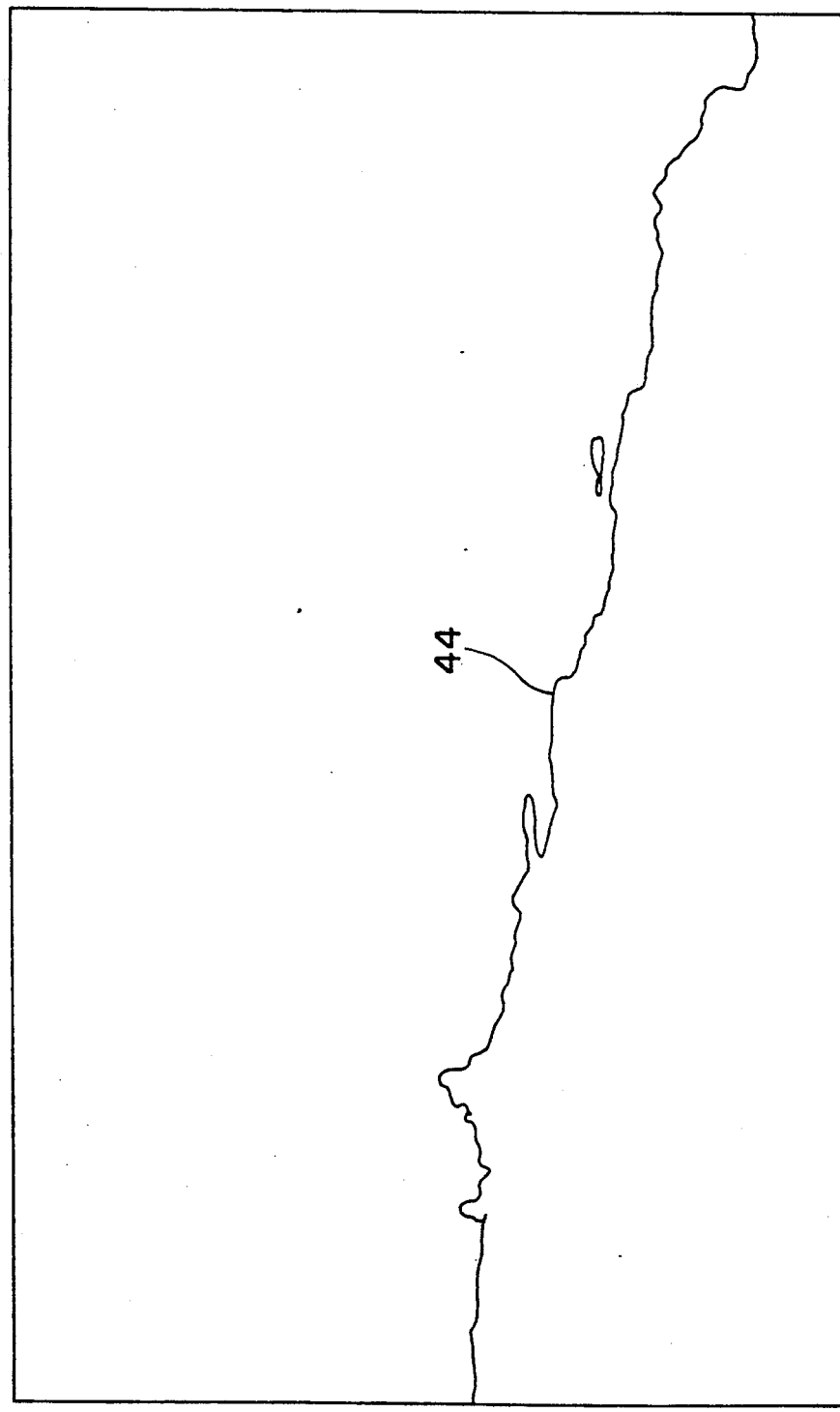
FIG. 6 illustrates the boundary between the gray and white regions of FIG. 5.
Figure 7:
FIG. 7 is a copy of FIG. 2a with the boundary of FIG. 6 superimposed upon it.

The flow field generation or range estimation routine 16 may use a conventional Barnard-Thompson alogrithm such as that described in the above-identified Merchant article. It produces, for those pixels in the image for which range-related information is correlatable, a parameter related to the range of that pixel with respect to the camera's focal plane. The outputs of the segmentation routine 14 and the range estimation routine 16 are combined at 18 to form a motion or range image (FIG. 5) in which the range values generated by routine 16 are interpolated so as to fill each pixel of those FIG. 4 regions in which range information is available, with a first-order fit interpolated range value of the range value located in that region. This range image is processed by a Marr-Hildreth algorithm or equivalent process to provide the range discontinuity or occlusion boundary detection 20 (FIG. 6). When the detected boundary is superimposed upon one the input images 10 or 12, the outline of a range discontinuity can be clearly seen (FIG. 7).

A practical application of the invention is shown in FIGS. 2-7. FIG. 2a is an infrared image 10 of a town taken from a moving aircraft, while FIG. 2b is the corresponding image 12 taken a moment later. In both images, there is a white area 30 which, as far as the image is concerned, may be either a range of hills or a flat area of even temperature.

Figure 3:
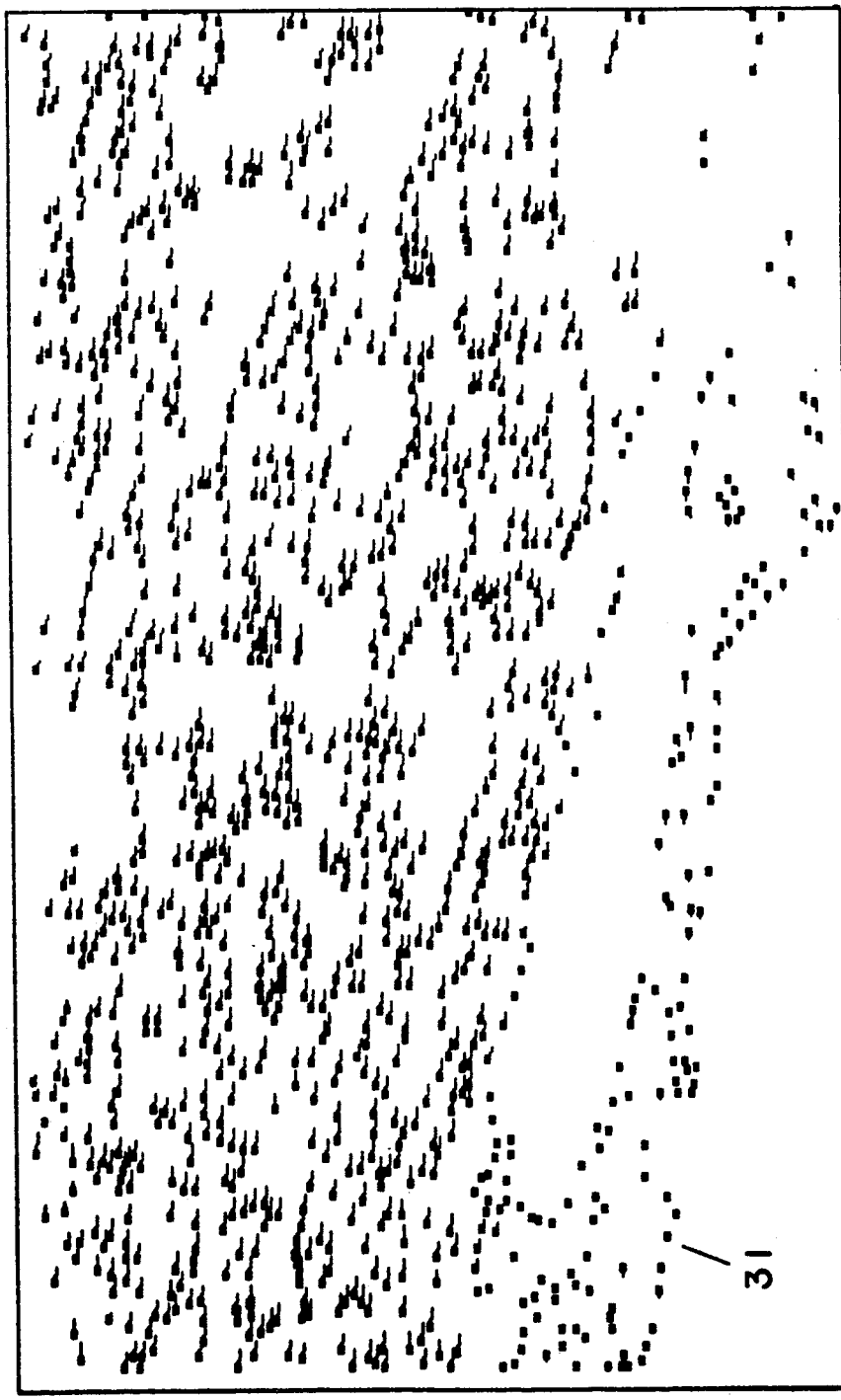
FIG. 3 is a map of pixels found to correspond in the images of FIGS. 2a and 2b, together with their range information.

When the images 10, 12 of FIGS. 2a and 2b are processed by the range estimation program 16, the result is the image 32 shown in FIG. 3. In that image, pixels of image 10 which the range-estimation program 16 was able to correlate with corresponding pixels of image 12 for range-determining purposes are illustrated by black dots 31 coded to indicate range values (the tails on the dots 31 are a function of the algebraic distance of that pixel from the camera's focal plane). It will be noted that, particularly in the foreground area of interest, pixels with known range values are few and far between.

Processing of image 10 or 12 by the segmentation program 14 produces the image 34 of FIG. 4. In the image 34, intensity transitions which cause the second derivative of intensity to change sign are mapped to form a pattern of closed regions such as 36.

The images 32 and 34 can now be combined by interpolation on a region-by-region basis. If a region 36 in image 34 contains one or more pixels of known range value in image 32, all pixels of the region 36 are coded with a range value equal to the first-order fit of the range values of the known pixels in region 36. If there are no known pixels in region 36, the pixels of region 36 may be encoded with a null value which is disregarded in any subsequent computation.

Figure 5:

The result of the interpolation is the image 42 of FIG. 5. In image 42, range information is encoded in a 256-level gray scale. In FIG. 5, white is distant, light gray intermediate, dark gray near, and black is the null value indicating a lack of information.

By plotting the location of the boundary 44 between gray and white areas of the image 42, the boundary image 46 of FIG. 6 is obtained. The range discontinuity information provided by image 46 can be used for whatever purpose is desirable; for example, it may be superimposed in a display upon the image 10 to form the image 48 of FIG. 7, in which the white area 30 is identified as a hill, and a substantially accurate outline of the hill 30 is sharply defined.

It is of course desirable in most applications of this technology to produce image information in real time, i.e. to convert, for example, image sets 10, 12 into images 48 at the 30-frames-per-second rate of a standard video scan. Performing discontinuity-detecting analyses at this rate in the prior art required considerable computing power available only with heavy and expensive equipment.

The invention reduces the required computing power considerably, as compared to prior art approaches, because only the segmentation program 14 needs to analyze the images 10, 12 pixel by pixel. The range-estimating algorithm 16 need be applied only to those pixels identified as range-correlatable in images 10,12; the range image formation program 18 interpolator 22 needs to fill all pixels but compute information only from those pixels for which range value exists; and the depth discontinuity detection program 20 needs to examine only those pixels which are adjacent to a region boundary.

I claim:

1. A method of generating range discontinuity information in an imaged scene, comprising the steps of:
    a) locating intensity transitions in a pair of stereoscopically related images of said scene;
    b) locating identifiably corresponding intensity transitions in said related images;
    c) computing a parameter related to the range of said corresponding intensity transitions;
    d) defining closed regions of similar intensity in said scene;
    e) assigning to said regions parameter values derived from the computed parameter of corresponding intensity transitions lying within said regions; and
    f) locating the boundary between adjacent regions for which said assigned parameter values are substantially different.

2. The method of claim 1, in which the parameter value assigned to one of said regions is a first-order fit of the computed range values for corresponding transitions lying within that region.

3. The method of claim 2, in which a null parameter value is assigned to regions in which there are no corresponding intensity transitions.

4. Apparatus for reconstructing three-dimensional image information from a pair of stereoscopically related two-dimensional images of a scene, comprising:
    a) means for detecting intensity transitions in said scene;
    b) means for determining a range-related parameter of identifiably corresponding ones of said intensity transitions in said images;
    c) means for establishing in one of said images closed regions of similar intensity;

d) means for assigning to each of said regions parameter values derived from the parameters determined for transitions lying within said regions; and e) means for generating an indication of the boundary between adjacent regions having substantially different parameter values assigned to said regions.

5. The method according to claim 4, further including the step of superimposing an indication of said boundary upon said one of said images, and displaying the composite image thus formed.

6. A method of reconstructing three-dimensional image information from a pair of stereoscopically related two-dimensional images of a scene, comprising the steps of:

a) detecting intensity transitions in said scene;

b) determining a range-related parameter of identifiably corresponding ones of said intensity transitions in said images;

c) establishing in one of said images closed regions of similar intensity;

d) assigning to each of said regions parameter values derived from the parameters determined for transitions lying within said regions; and e) generating an indication of the boundary between adjacent regions having substantially different parameter values assigned to said regions.

* * * * *